Feb. 19, 1963 B. J. DUNCAN 3,078,425
NON-RECIPROCAL TM MODE TRANSDUCER
Filed July 12, 1956 3 Sheets-Sheet 1
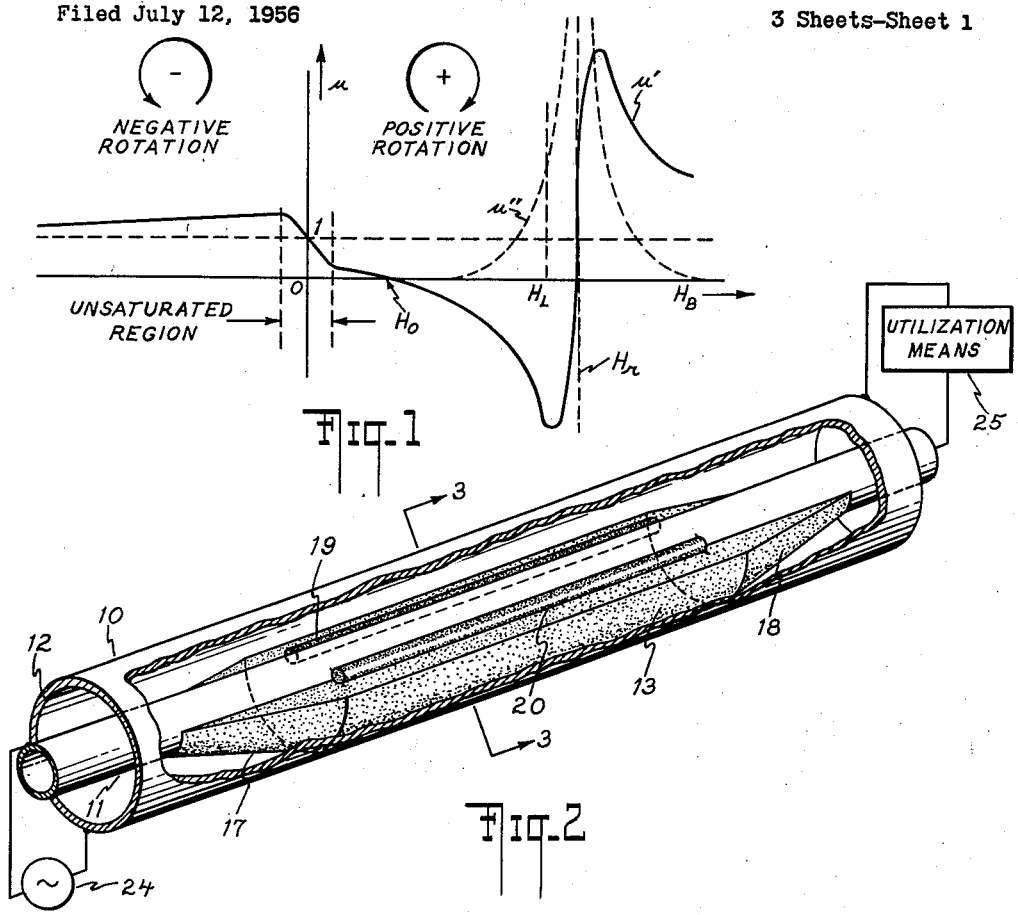
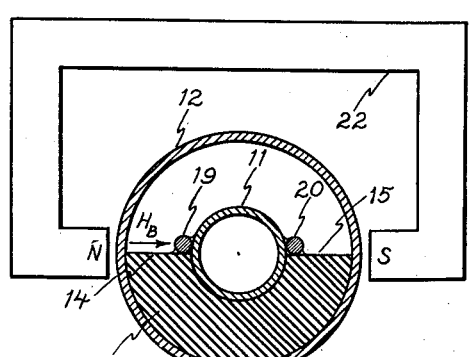
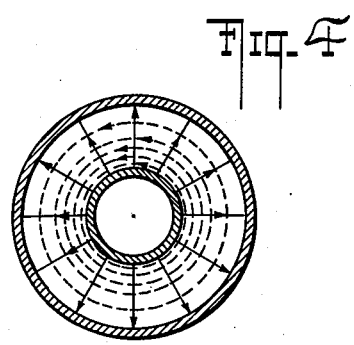
INVENTOR
BOBBY J. DUNCAN
BY
ATTORNEY Feb. 19, 1963   B. J. DUNCAN   3,078,425
NON-RECIPROCAL TM MODE TRANSDUCER
Filed July 12, 1956   3 Sheets-Sheet 2
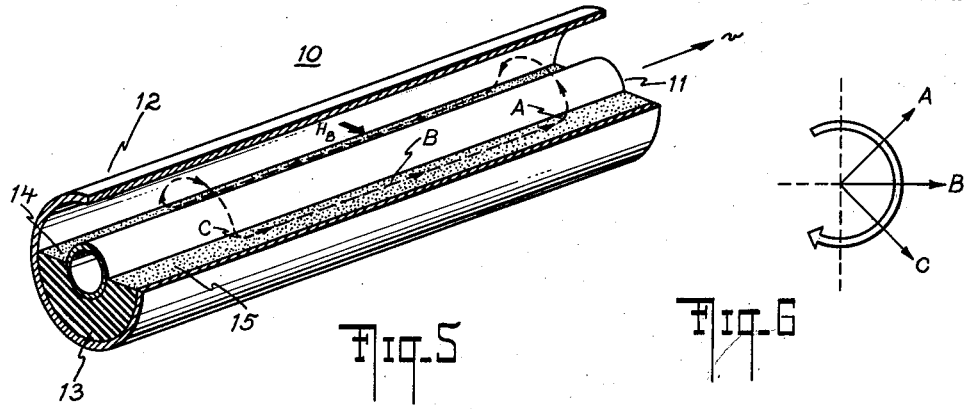
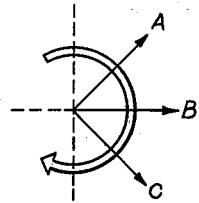
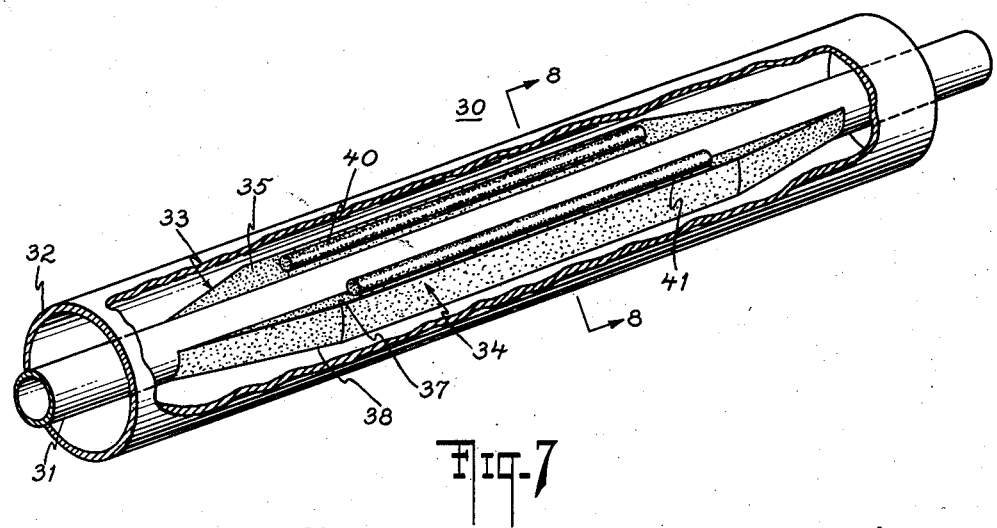
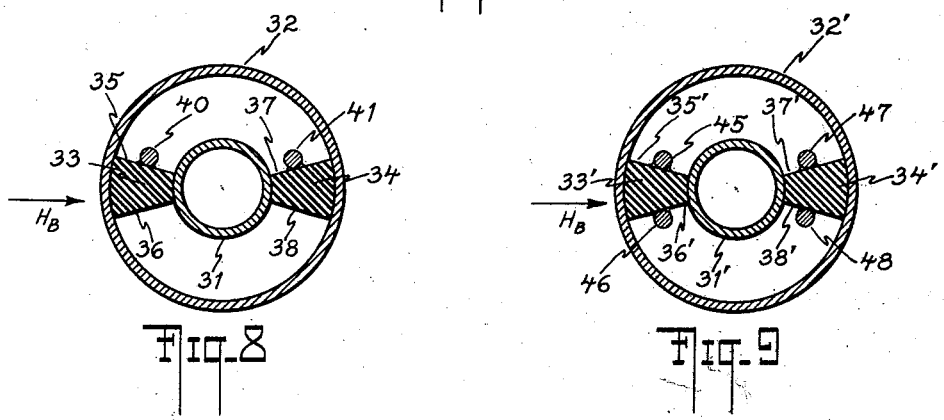
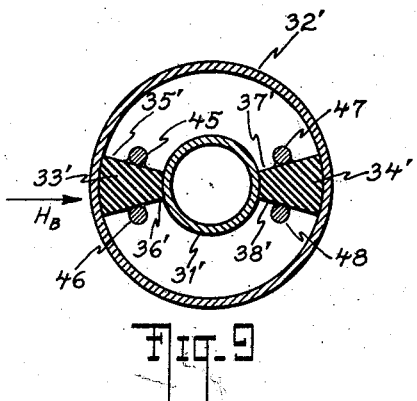
INVENTOR
BOBBY J. DUNCAN
BY
ATTORNEY Feb. 19, 1963  B. J. DUNCAN  3,078,425
NON-RECIPROCAL TM MODE TRANSDUCER
Filed July 12, 1956  3 Sheets-Sheet 3

INVENTOR
BOBBY J. DUNCAN
BY
ATTORNEY

United States Patent Office 3,078,425
Patented Feb. 19, 1963

3,078,425
NON-RECIPROCAL TM MODE TRANSDUCER
Bobby J. Duncan, Port Washington, N.Y., assignor to Sperry Rand Corporation, a corporation of Delaware
Filed July 12, 1956, Ser. No. 597,503
18 Claims. (Cl. 333—24.1)

This invention relates to non-reciprocal transducers for transmission means propagating transverse magnetic waves, and more particularly to coaxial transmission line isolators.

A non-reciprocal transducer is a device having an energy transfer function dependent on the direction of energy passage therethrough. An isolator is a non-reciprocal transducer which freely transfers energy in one direction, but prohibits passage of energy in the reverse direction. Isolators are employed, for example, in microwave transmission systems to prevent transmitting devices, such as klystrons and magnetrons, from receiving waves reflected from loads, such as antennas.

Non-reciprocity is commonly achieved by the employment of ferrite members for interacting with electromagnetic waves. When a ferrite member is placed in the path of a circularly polarized magnetic field and a biasing magnetic field is applied thereto, the response of the ferrite member will depend on the sense of rotation of the circular polarization. For example, a ferrite member will exhibit gyromagnetic resonance to waves having positively rotating circularly polarized magnetic fields, substantially attenuating the waves, but waves having the opposite sense of rotation will not be affected.

In certain transmission devices at least a portion of the magnetic field component of waves traveling therethrough is circularly polarized. If, in such devices, the sense of rotation of the forward wave (the wave traveling toward the load) is opposite that of the backward wave, the employment of a ferrite member will produce non-reciprocal effects. On the other hand, as a linearly polarized wave comprises two equal and opposite circularly polarized components, it will always interact similarly with a ferrite member in a transmission device whether the wave is a forward wave or a backward wave. Non-reciprocal operation cannot be obtained unless at least a portion of the waves are circularly polarized. Consequently, in order that a ferrite transducer function as an isolator, it is essential that the wave transmitted therethrough propagate in a mode in which at least a portion of the magnetic field component is circularly polarized. Prior art isolators have employed rectangular or circular waveguide sections as the isolator wave transmission means. When a wave is propagated along a waveguide section in the transverse electric mode a portion of the magnetic field component is circularly polarized. By placing a ferrite member in the path of the circularly polarized magnetic field portion isolation or other non-reciprocal effects are produced.

However, in waveguides operating in the transverse magnetic mode, and in certain other transmission means operating in the transverse electromagnetic mode, such as coaxial transmission lines, strip lines and open wire transmission lines, the entire magnetic field component of the wave is transverse to the direction of propagation. As the magnetic field of a transverse electromagnetic wave is completely transverse, as it is in a transverse magnetic wave, in the following description and claims the term "transverse magnetic" is understood to be generic to both transverse magnetic and transverse electromagnetic. Waves wherein the magnetic field component is completely transverse have no circularly polarized magnetic field component. Consequently, non-reciprocal operation in transmission means of this type has heretofore been unknown.

It is the principal object of this invention to provide a non-reciprocal transducer for transmission means propagating waves wherein the entire magnetic field component is transverse to the direction of propagation.

It is a further object of this invention to provide a non-reciprocal transducer for transmission means propagating waves in a transverse magnetic mode.

It is a further object of this invention to provide a non-reciprocal transducer for transmission means propagating waves in the transverse electromagnetic mode.

It is a further object of this invention to provide a non-reciprocal coaxial transmission line transducer.

It is a further object of this invention to provide a coaxial transmission line isolator.

It is a further object of this invention to provide means for inducing circularly polarized magnetic field components in a transmission means propagating waves in a transverse magnetic mode.

In accordance with the present invention non-reciprocal devices may be adapted for employment in coaxial transmission lines, strip lines, and open wire transmission lines, or in waveguides operating in the transverse magnetic propagation mode. By way of example, an air-filled coaxial transmission line constructed according to the principles of this invention will be described. An elongated dielectric member having a cross-sectional shape in the form of a section of an annulus extending between the inner and outer conductors is disposed parallel to the axis of the coaxial transmission line. The permittivity, or dielectric constant, of the dielectric member is substantially greater than the permittivity of air. A transverse electromagnetic wave propagating along the coaxial line will be distorted on reaching the dielectric member, whereupon higher order modes are induced having a portion of the magnetic field component circularly polarized. A ferrite member immersed in a biasing magnetic field is disposed between the inner and outer conductors of the coaxial line and in the path of the circularly polarized magnetic field portion. By adjusting the value of the biasing magnetic field, the ferrite member will exhibit gyromagnetic resonance to waves traveling in but one direction and the device will act as an isolator.

The present invention will be described with reference to the following drawings wherein:

FIG. 1 is a graph of the real and imaginary parts of the effective permeability as a function of applied magnetic field for ferrites;

FIG. 2 is a perspective view, partly in cross-section, of the preferred isolator of this invention;

FIG. 3 is a cross-sectional view, taken along the line 3—3 of the isolator of FIG. 2;

FIG. 4 is a drawing of the transverse electromagnetic field pattern of a transverse electromagnetic wave in a coaxial transmission line;

FIG. 5 is a perspective drawing, partly in cross-section of the isolator of FIG. 2, illustrating the magnetic field component pattern;

FIG. 6 is a drawing of the instantaneous direction of the magnetic field component of FIG. 5;

FIG. 7 is a perspective view, partly in cross-section, of another embodiment of the isolator of FIG. 2;

FIG. 8 is a cross-sectional view, taken along the line 8—8 of the isolator of FIG. 9;

FIG. 9 is a cross-sectional view of another embodiment of the isolator of FIG. 7;

Figure 10:
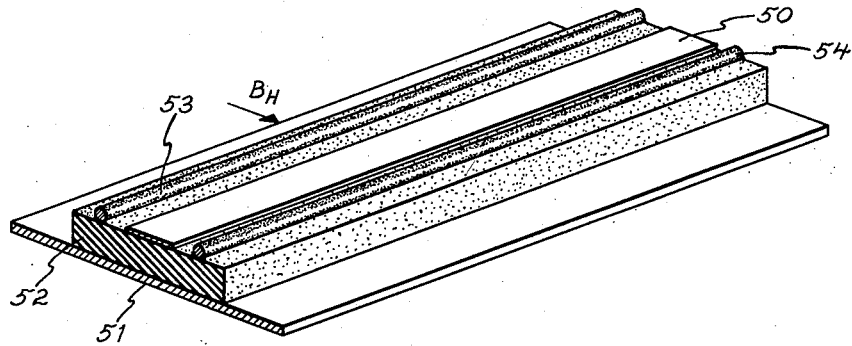
FIG. 10 is a perspective view, partly in cross-section, of another embodiment of this invention.

Ferrites can be described as polycrystalline materials of spinel structure which are formed at high temperature by the solid-phase reactions of iron oxide and one or more divalent metallic oxides. By varying the ingredients and the processing techniques, wide ranges in the general properties of ferrites can be obtained. Ferrites in their simplest form correspond to the general chemical formula $XOFe_2O_3$, where X represents the divalent metal. Ferrites represented by the above general formula fall into two main classes; those which are ferromagnetic and those which are not. Whether a ferrite falls into one or the other of these classes depends on the divalent metallic oxide used. For example, those ferrites in which X is magnesium, copper, manganese, lithium, nickel, lead, iron, calcium, or cobalt, are ferromagnetic. The ferromagnetic ferrites are ceramic-like materials characterized by low conductivity, low losses, and high permittivity.

It is well known that the R-F permeability of a saturated ferromagnetic material is not a scalar quantity, but instead the alternating flux density in the medium is related to the alternating field by a tensor permeability. The tensor components of the permeability are complex quantities. This unique tensor permeability is the property of ferrites that makes them useful in the microwave art.

The ferrite's microwave permeability is due to the effect of certain electrons which behave as a group in a gyroscopic manner. The charge, mass, and spin of these electrons are associated with an angular momentum and a magnetic moment, which are those to be expected for a spinning mass and a spinning negative charge. With the application of a steady magnetic biasing or polarizing field, the axis of the electron spin becomes aligned with the direction of the steady field. If the spin axis is momentarily deflected from parallelism with the steady field, it will not return to its original position immediately, but will precess as a gyroscope about an axis parallel to the direction of the steady magnetic field. The precessional frequency is proportional to the magnitude of the steady magnetic field. This frequency is called the gyromagnetic resonant frequency. Under the influence of damping forces which exist in the solid, this precessional motion gradually ceases and the axis of the rotating electrons lines up once more with the direction of the static magnetic field. The direction of precession of the spin axis is in the direction of a positive electric current which would create the static magnetic field.

If now a component of alternating magnetic field is applied perpendicularly to the static biasing or polarizing field, the resultant magnetic vector is no longer parallel with the spin axis, and precessional motion occurs. If the applied alternating magnetic field is one that is circularly polarized in the direction of precession and if its frequency is equal to the gyromagnetic resonant frequency, the amplitude of the precessional motion will become great, and the energy of the alternating magnetic field will be absorbed by the precessing electrons. Such a wave is said to be rotating in the positive sense. On the other hand, if the rotation of the alternating magnetic field is of the opposite sense of circular polarization, no absorption will occur and the electron will not precess. Such a wave is said to be rotating in the negative sense.

Thus, ferrite materials will exhibit gyromagnetic effects and with the proper strength of magnetic biasing or polarizing field will exhibit gyromagnetic resonance to electromagnetic waves traveling in one direction with one sense of rotation of the magnetic field component, and will thus attenuate these waves, but will not substantially affect waves traveling in the opposite direction, as these waves have the opposite sense of rotation of the magnetic field. The amount of attenuation due to gyromagnetic resonance is proportional to the length of the ferrite material exposed to the waves along their direction of travel. Consequently, to achieve the desired degree of isolation, that is, to reduce the reflected wave to a negligible value or to less than a predetermined value it is necessary to use a ferrite member of sufficient length.

Isolation may also be achieved by the employment of another method of operation of ferrite materials. This method is described in U.S. patent application Serial No. 551,915 by M. B. Loss and P. J. Sferrazza, and Serial No. 551,872 by B. J. Duncan, both filed December 8, 1955, and both abandoned. Oppositely rotating circularly polarized magnetic field components encounter different propagation constants in a ferrite due to the form of its plane wave tensor permeability. The component permeabilities, which are complex scalar quantities, encountered by the two circularly polarized components depend on the material, the frequency of the wave, and the strength of the applied magnetic field. The real and imaginary parts of the scalar permeability, designated respectively $\mu'$ and $\mu''$, which are presented to the circular polarized components of a wave by a ferromagnetic ferrite are shown in FIG. 1 as a function of the applied magnetic field intensity H. These curves will be similar for different ferrites at different frequencies, and will differ only in magnitude and the positions of critical points. The magnetic field for the aforementioned gyromagnetic resonance effect is indicated at the point designated $H_r$ on the curves. The propagation constant of an electromagnetic wave in a medium is proportional to the factor $(\mu\epsilon)^{1/2}$, where $\mu$ is the permeability and $\epsilon$ the permittivity of the medium. If the permeability encountered by a wave is zero, the propagation constant does not exist and the wave will not propagate in the medium. Thus, the medium will act similar to a conductor for any wave incident thereon.

Referring once more to FIG. 1, it may be noted that for a given material, two values of applied magnetic field exist for which the real part of the permeability is zero for the positively rotating magnetic field component of the wave. The lesser of these two magnetic field values is designated $H_0$. If the imaginary part of the permeability is very small when the real part is zero, the total effective permeability is practically zero and the positively rotating waves cannot propagate in the medium. On the other hand, with this value of applied magnetic field, the permeability is finite for the negatively rotating magnetic field component, and this wave component will propagate through the ferrite. Operation at the lesser value of applied magnetic field that yields a zero real part of the permeability is preferred since the source of field may be smaller and the imaginary part of the permeability is very low. Many ferrites exhibit both a low imaginary part and a zero real part of the permeability for waves of one sense of rotation. In particular, magnesium-manganese ferrites, nickel-zinc ferrites, nickel-aluminate ferrites, and many nickel ferrites display this characteristic. The commercially available Ferramic R-1 product of the General Ceramics Corporation has this type of permeability.

The presently preferred embodiment of the isolator of this invention, shown in FIGS. 2 and 3, includes a coaxial transmission line section 10 having coaxially disposed inner and outer conductors 11 and 12. The region included between inner conductor 11 and outer conductor 12 is generally air-filled, although it may be filled with some other low loss dielectric. Interposed between inner conductor 11 and outer conductor 12 is an elongated dielectric member 13 having a cross-sectional shape in the form of a sector of an annulus. In this embodiment the arc subtended by the two plane boundaries 14, 15 of the dielectric member is 180°. Although this angle is presently preferred, it is not necessary for satisfactory operation of the device. The angle may be, for example, greater or less than 180°. The permittivity, $\epsilon$, of dielectric member 13 must be substantially different from that of the dielectric filling between the inner and outer conductors. A pair of tapered matching portions 17 and 18 composed of the same material as dielectric member 13, are appended at each end thereof and afford a smooth transition from a coaxial line section without a dielectric member to a coaxial line section with dielectric member 13. A pair of elongated ferrite members, such as ferrite rods 19 and 20, are disposed opposite boundaries 14 and 15 and adjacent inner conductor 11. Although a pair of ferrite rods will materially shorten the length of material needed for isolation, the invention may be practiced with but one of the two ferrite rods. A source of magnetic field, such as a permanent magnet 22, may be employed for providing a magnetic field, $H_B$, as indicated, parallel to boundaries 14 and 15 and perpendicular to the axis of coaxial line section 10 for biasing ferrite rods 19 and 20. However such a source is not always necessary, as permanently magnetized ferrite members may sometimes be employed. A generator of electromagnetic waves 24, such as a klystron or magnetron, is connected to one end of coaxial line section 10. A utilization means 25, such as an antenna, is connected to the other end of coaxial line section 10 for absorbing or utilizing the energy delivered therethrough.

To clarify the ensuing explanation of the operation of this device, the following definitions are adopted:

Positive rotation—rotation in a direction of the positive electric current which creates a steady longitudinal magnetic field.

Negative rotation—rotation in the direction opposite the positive electric current which creates a steady longitudinal magnetic field.

The operation of this invention may be readily understood by considering the drawings of the electromagnetic field configurations of FIGS. 4 and 5 in conjunction with the structure of FIGS. 2 and 3. Wave generator 24 launches an electromagnetic wave toward the right in coaxial line section 10 of FIG. 2. The dominant wave transmitted in a coaxial line is the transverse electromagnetic, designated TEM, and illustrated in FIG. 4. In this wave the entire magnetic field component, in the form of concentric circular loops, lies in a transverse plane; that is, a plane perpendicular to the direction of propagation. This wave has no portion of the magnetic field component circularly polarized, the necessary condition for achieving non-reciprocity according to the principles previously described. However, this TEM field configuration is now distorted by a device constructed according to the teachings of this invention, so that as the wave travels toward the right through the coaxial line higher order modes are induced in which at least a portion of the magnetic field components are circularly polarized. Ferrite members may then be introduced in the path of the circularly polarized portions and non-reciprocity be obtained.

The TEM wave of FIG. 4 travels toward the right in coaxial line 10 and encounters dielectric member 13. As plane wave phase velocity is inversely proportional to $(\mu\epsilon)^{1/2}$, the plane wave phase velocity in dielectric member 13 will be substantially different from that of the air-filled region. Consequently, the field configuration is bent or distorted as it travels through the section of coaxial line 10 which contains dielectric member 13. Magnetic field loops similar to that shown in FIG. 5 exist in the distorted wave. This distorted loop now contains a circularly polarized component. Magnetic field loops of the type shown are to be found not only in the air-filled region above dielectric member 13 but also within the dielectric member. An analysis of the instantaneous field directions of the distorted magnetic field loop at a fixed point in coaxial line member 10 will indicate the sense of rotation of the component. Thus, consider points A, B and C in the magnetic field loop. As the wave moves toward the right with a velocity $v$ as shown, a stationary observer will see the field pointing in the successive directions of A, B, and C, as shown in FIG. 6, if his line of vision is directed perpendicular to the coaxial line axis and parallel to the plane of boundaries 14 and 15. Thus, the magnetic field component appears to be rotating in a clockwise manner and is rotating in a negative sense in accordance with the previous definition. Similarly, waves traveling to the left in this device will have a magnetic field component rotating in the positive sense.

Ferrite rods 19 and 20 are located in the path of the circularly polarized magnetic field components. Circularly polarized components of the same sense of rotation are found to exist on both sides of center conductor 11. If now a value of biasing magnetic field, $H_B$, is produced equal to $H_r$ of FIG. 1, waves propagating toward the right in FIGS. 2 and 5 will be relatively unaffected by the ferrite rods. On the other hand, the ferrite rods will exhibit gyromagnetic resonance toward any wave which may be reflected from utilization means 25 or which travels toward the left in coaxial line secion 10. Thus, these waves will be sharply attenuated, and if the ferrite rods are of sufficient length no appreciable wave will be returned to the wave generator 24.

An example of this device employed standard air-filled $\frac{7}{8}''$ coaxial line, having a $\frac{3}{8}''$ O.D. inner conductor and an .811" I.D. outer conductor. A polystyrene dielectric member whose plane boundaries subtended an arc of 180° extended between the inner and outer conductors. A pair of ferrite rods having lengths of 3" and respective diameters of .080" and .100" were used. The ferrite rods were composed of Ferramic H-419, a nickel-zinc ferrite product of the General Ceramics Corporation. The biasing magnetic field was adjusted so that the ferrite rods exhibited gyromagnetic resonance at 3600 mc. to waves traveling in one direction, a field value of approximately 2400 gauss. At 3600 mc. the isolator then passed waves traveling in one direction with an attenuation of but 1.3 db. Waves traveling in the opposite direction, however, experienced a loss of 41.7 db.

The device of FIGS. 2 and 3 may operate according to another mode and yet be within the scope of this invention. If the biasing magnetic field, $H_B$, be reversed from that shown in FIGS. 3 and 5; that is, it will now point toward the left in FIG. 3, and be set equal to the value $H_0$ in FIG. 1, the ferrite rods will exhibit zero effective permeability to circularly polarized waves rotating in the positive sense. The wave traveling to the right in coaxial line section 10 will now have a portion of its magnetic field component rotating in the positive sense. The ferrite rods will exhibit zero effective permeability to this wave, and act similar to conducting surfaces in accordance with the principles previously described. The wave will not penetrate substantially below the surfaces of the ferrite rods and will propagate unattenuated toward the right. On the other hand, the reflected wave will have a portion of its magnetic field component rotating in the negative sense. As the ferrite effective permeability to the reflected wave is greater than unity and the dielectric constant is considerably greater than unity, the ferrite rods will act as dielectric waveguides, and a considerable portion of the wave will propagate through the ferrite rods. If the rods are substantially electrically lossy or have lossy material inserted therein, as described in the aforementioned patent application Serial No. 551,872, the reflected wave will be attenuated. However, as the wave propagating toward the right did not pass into the interior of ferrite rods 19 and 20, these waves were unattenuated, and isolation is thereby accomplished.

Another embodiment of the isolator of FIG. 2 is shown in FIGS. 7 and 8, and includes a coaxial transmission line section 30 having coaxially disposed inner and outer conductors 31 and 32. The region included between inner conductor 31 and outer conductor 32 is generally air-filled, although it may be filled with some other low loss dielectric.

Interposed between inner conductor 31 and outer conductor 32 are a pair of elongated dielectric members 33 and 34, each having a cross-sectional shape in the form of a sector of an annulus. The arcs subtended by the two plane boundaries 35 and 36 of member 33 and 37 and 38 of member 34 are each substantially less than 180°. The permittivity of dielectric members 33 and 34 is the same and is substantially different from that of the dielectric filling between the inner and outer conductors. A pair of elongated ferrite members, such as ferrite rods 40 and 41 are disposed adjacent respective boundaries 35 and 37 of the dielectric members. A source of magnetic field, not shown, may be employed for providing a biasing magnetic field, $H_B$, directed parallel to a diametral plane bisecting the arcs subtended by dielectric members 33 and 34 and perpendicular to the axis of coaxial line section 30.

In the manner described previously, the field configuration of the dominant TEM wave is bent or distorted as it travels through the section of coaxial line 30 which contains dielectric members 33 and 34. Magnetic field loops, similar to that shown in FIG. 5, exist in the resulting distorted wave. With reference to the biasing magnetic field, $H_B$, shown, the circularly polarized magnetic field opposite surfaces 35 and 37 is of one sense of rotation and that opposite surfaces 36 and 38 of the opposite sense of rotation. Consequently, by adjusting the value of biasing magnetic field so that the ferrite rods exhibit gyromagnetic resonance for waves reflected from the load or zero effective permeability for waves traveling toward the load, isolation will be achieved in accordance with the principles previously described.

A structure similar to that of FIG. 7 may be employed in another non-bilateral device, such as that shown in FIG. 9. The device of FIG. 9 is constructed generally in a manner similar to the isolator of FIG. 7, except that two sets of ferrite rods are employed, one set interacting with a wave traveling in one direction and the other set interacting with a wave traveling in the reverse direction. Thus, a pair of ferrite rods 45 and 47 are disposed opposite surfaces 35' and 37' and a pair of ferrite rods 46 and 48 are disposed opposite surfaces 36' and 38'. A biasing magnetic field is applied in the direction indicated. A negatively rotating magnetic field will pass ferrite rods 45 and 47 and a positively rotating magnetic field will pass rods 46 and 48 for the forward or incident wave. A positively rotating magnetic field will pass rods 45 and 47 and a negatively rotating magnetic field will pass rods 46 and 48 for the backward or reflected wave. Rods 45 and 47 are designed to have a different gyromagnetic resonance frequency than rods 46 and 48. This may be accomplished in a manner described according to the teachings of U.S. patent application Serial No. 579,421 by B. J. Duncan, filed April 16, 1956, now U.S. Patent 2,956,245, issued October 11, 1960, and assigned to the same assignee as the instant invention. As taught in said patent, the gyromagnetic resonance frequency may be determined by controlling the shape of the ferrite specimen or the material of which it is composed. Consequently, the shape or material of ferrite rods 45, 46, 47, and 48, and the strength of the biasing magnetic field are adjusted so that ferrite members 45 and 47 exhibit gyromagnetic resonance to the backward wave whereas ferrite members 46 and 48 operate on the side of the gyromagnetic resonance curve; such as the point designated $H_L$ in FIG. 1 for the forward wave. Actually, $H_L$ and $H_r$ are the same value of biasing magnetic field, but their permeability curves differ for the two materials, so that the two points $H_L$ and $H_r$ on their respective permeability curves are the same value. In this manner the backward wave is eliminated by ferrite members 45 and 47 whereas ferrite members 46 and 48 introduce a predetermined amount of attenuation into the forward wave. The amount of attenuation of the forward wave depends on the point of the permeability curve of rods 46 and 48 at which operation occurs. Hence, the device of FIG. 9 is an isolator-attenuator, in which a controllable amount of attenuation of the forward wave is employed and where any backward wave is eliminated.

The principles of this invention may be employed in the single-ground-plane strip transmission line of FIG. 10. The strip transmission line comprises a narrow flat strip conductor 50 supported above a parallel conducting ground plane 51 by an intermediate dielectric slab 52. An essentially transverse field exists in dielectric slab 52 when a wave propagates along the strip line in the dominant mode. However, at the upper surface of dielectric slab 52 and proximate strip conductor 50, the field is distorted because of the different plane wave phase velocities in air and in dielectric slab 52. This distorted wave contains circularly polarized magnetic field components. Consequently, a pair of ferrite rods 53 and 54 are disposed opposite the upper surface of slab 52 and close to strip conductor 50 in the path of the circularly polarized magnetic field components. By employing a suitable biasing magnetic field, the ferrite rods may be caused to interact with the circularly polarized wave in the manner previously described.

Figure 11:
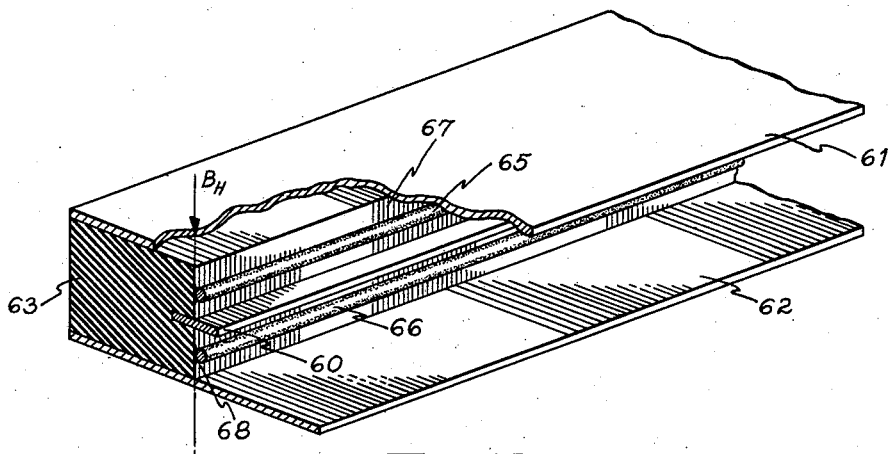
FIG. 11 is a perspective view, partly in cross-section, of another embodiment of this invention.

The principles of this invention may be further employed in the double-ground-plane strip transmission line of FIG. 11. The strip transmission line comprises a narrow flat strip conductor 60 disposed symmetrically between parallel conducting ground planes 61 and 62. In the conventional structure of such a strip transmission line, strip conductor 60 is supported from ground planes 61 and 62 by a dielectric filling, such as polyfoam, or by spaced discrete support posts. In normal operation a wave propagates parallel to strip conductor 60 in a TEM mode. In accordance with the principles of this invention, instead of the support members previously mentioned, a dielectric member 63 fills the region between strip conductor 60 and the two ground planes 61 and 62 on one side of the transverse center line of the device. The TEM wave becomes distorted as it propagates through the region of the strip transmission line that contains dielectric member 63 and circularly polarized magnetic field components are realized. Ferrite members 65 and 66 are disposed opposite the respective surfaces 67 and 68 of dielectric member 63 and in the path of the circularly polarized magnetic field components. Upon the application of a proper transverse biasing magnetic field, the device will function as an isolator or attenuator.

Figure 12:
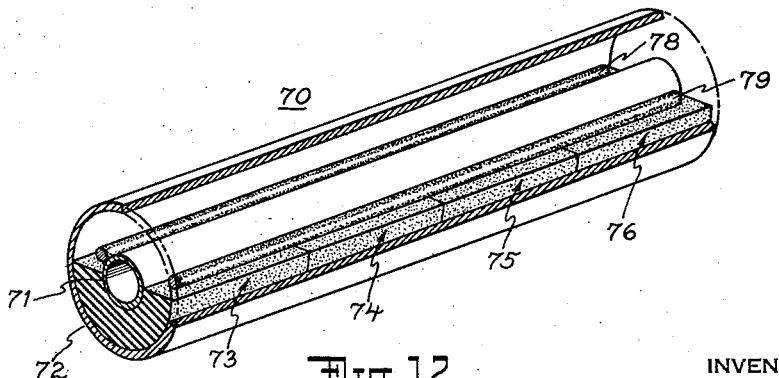
FIG. 12 is a perspective view, partly in cross-section, of another embodiment of the isolator of this invention.

A broad band embodiment of the isolator of this invention, which is applicable to all of the transducers heretofore described, is shown in FIG. 12. The principles of this embodiment are disclosed in the structure of a coaxial transmission line section 70 having coaxially disposed inner and outer conductors 71 and 72. A plurality of dielectric members 73, 74, 75 and 76 are interposed between inner conductor 71 and outer conductor 72. Each of dielectric members 73, 74, 75 and 76 has a different permittivity, each permittivity being substantially different from that of the dielectric filling between the inner and outer conductors. In this manner, the dominant TEM wave is distorted in a different manner in each section of coaxial line containing a different dielectric member. For a given dielectric member the location of the circularly polarized magnetic field component is a function of the frequency of the wave and the permittivity of the dielectric member. The position of the circularly polarized magnetic field component will coincide with that of the ferrite members 78, 79 at a different frequency for each dielectric member. By properly selecting the values of permittivity of members 73, 74, 75 and 76, the device may be made to act as an isolator or attenuator over a continuous broad range of frequencies.

Although it is not presently preferred, the dielectric members in the various embodiments of this invention may be composed of ferrite materials, as ferrites at microwave frequencies are dielectric in nature. In such case additional ferrite rods need not necessarily be employed, since circularly polarized magnetic field components are to be found within the dielectric member, as previously described.

This invention is not restricted to the employment of the particular transmission means illustrated, but may be employed in any transmission means in which a transverse magnetic wave is propagated. Furthermore, as indicated, the invention is not limited to an application in isolators, but is applicable to many devices such as attenuators, non-bilateral phase shifters, gyrators, etc.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A nonreciprocal electromagnetic wave energy guiding structure comprising a plurality of longitudinally extending conductive members adapted to propagate wave energy of solely transverse magnetic field distribution within a given frequency range of interest, means for impressing said energy upon said structure, one conductive member of said plurality of conductive members being symmetrically positioned with respect to the remainder of said plurality, elements of magnetically polarizable material exhibiting the gyromagnetic effect at frequencies within said given range spaced apart and extending longitudinally in coupling relationship with said energy between said members in at least two coextensive regions which fill together substantially less than the total transverse cross sectional area of said structure, said elements being disposed asymmetrically with respect to at least one longitudinally extending plane which passes through the center of said one conductive member, and means for establishing a biasing magnetic field in each of said elements in direction transverse to the longitudinal extent thereof, the magnetic biasing field in at least one of said elements having a direction relative to said one member and said remainder of members opposite to the direction of the magnetic biasing field relative to said members in at least one other of said elements.

2. A nonreciprocal electromagnetic wave energy guiding structure comprising at least two spaced apart longitudinally extending conductive members adapted to propagate wave energy of solely transverse magnetic field distribution within a given frequency range of interest, means for impressing said energy upon said structure, a medium possessing the properties of a dielectric at frequencies within said given frequency range substantially filling the space between and thereby electrically insulating said conductors, said medium comprising a plurality of coextensive longitudinally extending regions, one of said regions comprising a magnetically polarizable material which exhibits gyromagnetic effects at frequencies within said given range, another one of said coextensive regions having a permittivity different from that of said magnetically polarizable gyromagnetic material to produce a circularly polarized magnetic field component in said electromagnetic wave energy in the region of said magnetically polarizable gyromagnetic material, said magnetically polarizable gyromagnetic material being magnetized in a direction transverse to said circularly polarized magnetic field component.

3. The combination claimed in claim 2 wherein said electromagnetic wave energy guiding structure is a coaxial transmission line comprised of concentric inner and outer conductors and one of said regions is shaped in the form of a sector of an annulus.

4. The combination claimed in claim 3 wherein said magnetically polarized gyromagnetic material is magnetized in a radial direction.

5. The combination claimed in claim 2 wherein said electromagnetic wave energy guiding structure is a double-ground-plane strip transmission line comprised of a narrow flat strip conductor disposed symmetrically between parallel broad ground plane conductors, and said magnetically polarized gyromagnetic material is disposed asymmetrically between said conductors.

6. The combination claimed in claim 5 wherein said magnetically polarized gyromagnetic material is magnetized in a direction transverse to the broad ground plane conductors.

7. The combination claimed in claim 2 wherein said electromagnetic wave energy guiding structure is a single-ground-plane strip transmission line comprised of a narrow flat strip conductor disposed above a parallel broad conducting ground plane and said gyromagnetic material is asymmetrically positioned with respect to said conductors.

8. The combination claimed in claim 7 wherein said magnetically polarized gyromagnetic material is magnetized in a direction transverse to said broad conducting ground plane.

9. A nonreciprocal electromagnetic wave energy guiding structure comprising at least two continuous, parallel and spaced apart longitudinally extending conductive members adapted to propagate wave energy within a given frequency range of interest in a dominant mode of solely transverse magnetic field distribution, means for impressing said energy upon said structure, a medium possessing the properties of a dielectric at frequencies within said given frequency range substantially filling the space between and thereby electrically insulating said conductors, said medium comprising a plurality of coextensive longitudinally extending regions, one of said regions comprising a magnetically polarizable material which exhibits gyromagnetic effects at frequencies within said given range, another one of said regions extending substantially entirely transversely between said conductors and having a dielectric constant different from that of said magnetically polarizable material to produce a circularly polarized magnetic field component in said electromagnetic wave energy in the region of said magnetically polarizable material, said gyromagnetic material being magnetized in a direction transverse to the direction of propagation of said energy through said structure and transverse to said circularly polarized magnetic field component.

10. A nonreciprocal electromagnetic wave energy guiding structure comprising a plurality of continuous longitudinally extending conductive members adapted to propagate wave energy of solely transverse magnetic field distribution within a given frequency range of interest, means for impressing said energy upon said structure, one conductive member of said plurality of conductive members being symmetrically positioned with respect to the remainder of said plurality, a wave propagating medium extending between said members comprising at least three separate mutually transverse regions each extending longitudinally in coupling relationship with said energy, at least one of said regions comprising magnetically polarizable material which exhibits gyromagnetic effects at frequencies within said given range, the remainder of said regions comprising materials having at least two mutually different dielectric constants and the material in at least one of said remainder of regions being different from said gyromagnetic material, at least two of said regions having different dielectric constants being separated by a boundary extending transversely to said transverse magnetic field to distort said field and produce a circularly polarized magnetic field component, said gyromagnetic material being magnetized in a direction transverse to the direction of propagation of said energy through said structure and transverse to said circularly polarized magnetic field component.

11. A nonreciprocal electromagnetic wave energy guiding structure comprising a plurality of longitudinally extending conductive members adapted to propagate wave energy of solely transverse magnetic field distribution within a given frequency range of interest, means for impressing said energy upon said structure, one conductive member of said plurality of conductive members being symmetrically positioned with respect to the remainder of said plurality, a dielectric medium extending between said members comprising at least three separate mutually transverse regions each extending longitudinally in coupling relationship with said energy, at least one of said regions comprising magnetically polarizable material which exhibits gyromagnetic effects at frequencies within said given range, the remainder of said regions comprising materials having at least two mutually different dielectric constants, the material in at least one of said remainder of regions comprising a second gyromagnetic material, at least two of said regions having different dielectric constants being separated by a boundary extending transversely to said transverse magnetic field to distort said field and produce a circularly polarized magnetic field component, the first one of said gyromagnetic materials being magnetically biased in a direction transverse to said circularly polarized magnetic field component, said biasing magnetic field having a given direction with respect to said one conductive member and the remainder of said plurality of conductive members, said second gyromagnetic material being magnetically biased transversely to said circularly polarized magnetic field component in a direction opposite to said given direction with respect to said members.

12. A coaxial transducer comprising a section of coaxial transmission line for propagating an electromagnetic wave at a given frequency in a transverse magnetic mode, said line comprising concentrically disposed inner and outer conductors and having a dielectric material disposed between said conductors, a dielectric member disposed longitudinally between said conductors and having a permittivity different from that of said dielectric material, said dielectric member having a cross section in the form of a sector of an annulus and having a boundary extending substantially radially between said conductors, said dielectric member distorting said wave whereby a portion of the magnetic field component of said wave becomes circularly polarized, a ferrite member disposed between said conductors and in the path of said circularly polarized magnetic field component, said ferrite member being magnetized by a biasing magnetic field directed substantially normal to said conductors and substantially parallel to said radially extending boundary.

13. The combination claimed in claim 12 wherein said ferrite member is magnetized to the gyromagnetic resonance condition for a wave at said given frequency which is circularly polarized with a given sense of rotation and propagating in a given direction in said coaxial transmission line.

14. The combination claimed in claim 12 wherein said ferrite member is magnetized to the zero permeability condition for a circularly polarized wave at said given frequency which is propagating in a given direction in said coaxial transmission line.

15. A coaxial transducer comprising an air-filled coaxial line having inner and outer conductors coaxially disposed along an axis for propagating transverse magnetic waves at a given frequency, a dielectric member partially filling the air space between said conductors, said dielectric member having a permittivity different from that of air and having a plane surface extending parallel to said axis, whereby said waves propagate in said coaxial line with different velocities in said dielectric member and in said air space and generate a circularly polarized magnetic field component, an elongated ferrite member disposed parallel said axis and adjacent said plane surface in a region where the magnetic field component of said waves is circularly polarized, and means for directing a unidirectional magnetic field transverse to said axis and parallel to said plane surface for magnetizing said ferrite member to a predetermined state of magnetization for circularly polarized waves at said given frequency propagating in a given direction in said coaxial line.

16. A non-reciprocal electromagnetic transducer comprising transmission means having substantially parallel first and second conductors, said second conductor being separated from said first conductor by a first dielectric medium for propagating electromagnetic waves at a given frequency in a transverse magnetic mode, a second dielectric medium having a substantially different permittivity from that of said first medium disposed along said transmission means in the path of a portion of said waves, said two mediums having a common boundary extending transversely between said two conductors and extending parallel to the direction of propagation of said waves, whereby said waves propagate with different phase velocities on the two transverse sides of said boundary to produce a circularly polarized magnetic field component in said waves, and an element of magnetic polarized gyromagnetic material which exhibits the gyromagnetic effect at said frequency disposed in the path of said circularly polarized magnetic field component, said gyromagnetic element being magnetized in a direction normal to the direction of propagation of said waves and substantially normal to said circularly polarized magnetic field component.

17. A strip transmission line device for the non-reciprocal transmission of electromagnetic wave energy in a transverse magnetic mode within a given frequency range of interest comprising three transversely aligned conductive members extending longitudinally parallel and insulated from each other, the center one of said members being narrower in width than the outer ones and symmetrically positioned with respect to said outer ones, and an element of magnetically polarized material that exhibits gyromagnetic effects at frequencies within said given frequency range extending longitudinally between said members and asymmetrically positioned with respect thereto in the path of said electromagnetic wave energy, said gyromagnetic material being magnetized in a direction transverse to said broader outer members.

18. An electromagnetic wave transducer for non-reciprocally propagating electromagnetic waves within a given frequency range in a transverse magnetic mode, said transducer including a dielectric wave propagating medium extending longitudinally and comprising a plurality of mutually transverse regions having substantially different dielectric constants, means for impressing said electromagnetic waves in said transverse magnetic mode onto said propagating medium, at least two of said plurality of regions being separated by a boundary that extends transversely to magnetic field components of said solely transverse magnetic mode, whereby said waves propagate with different phase velocities in said transverse regions to produce a circularly polarized magnetic field component in said waves, one of said transverse regions being comprised of a magnetized material that exhibits gyromagnetic effects to said waves in said given frequency range, said gyromagnetic material being magnetized in a direction transverse to said circularly polarized magnetic field component and transverse to said wave guiding medium.

References Cited in the file of this patent

UNITED STATES PATENTS

| | | |
|---|---|---|
| 2,477,510 | Chu | July 26, 1949 |
| 2,743,322 | Pierce et al. | Apr. 24, 1956 |
| 2,755,447 | Engelmann | July 17, 1956 |
| 2,776,412 | Sparling | Jan. 1, 1957 |
| 2,777,906 | Shockley | Jan. 15, 1957 |
| 2,784,378 | Yager | Mar. 5, 1957 |
| 2,787,656 | Raisbeck | Apr. 2, 1957 |
| 2,806,972 | Sensiper | Sept. 17, 1957 |
| 2,887,665 | Suhl | May 19, 1959 |
| 2,900,557 | Webber et al. | Aug. 18, 1959 |
| 2,922,125 | Suhl | Jan. 19, 1960 |

(Other references on following page)

UNITED STATES PATENTS

| | | |
|---|---|---|
| 2,925,565 | Cook et al. | Feb. 16, 1960 |

FOREIGN PATENTS

| | | |
|---|---|---|
| 597,251 | Great Britain | Jan. 21, 1948 |
| 674,874 | Great Britain | July 2, 1952 |
| 1,089,421 | France | Sept. 29, 1954 |
| 165,097 | Australia | Sept. 8, 1955 |
| 541,439 | Italy | Mar. 29, 1956 |

OTHER REFERENCES

Reggia: "U.H.F. Magnetic Attenuator," Radio-Electronics Engineering, Vol. 20, No. 4, April 1953, pages 12–14, 24.

Rowen: Radio-Electronics Engineering, Vol. 24, No. 4, April 1955, pages 26–28, 40–41.

Sullivan et al.: Journal of Applied Physics, Vol. 26, No. 10, October 1955, pages 1282–83.